(12) United States Patent
Ikegami et al.

(10) Patent No.: US 7,537,050 B2
(45) Date of Patent: May 26, 2009

(54) HEAT EXCHANGER

(75) Inventors: Shuji Ikegami, Osaka (JP); Hirohiko Matsushita, Osaka (JP)

(73) Assignee: Daikin Industries, Ltd., Osaka-Shi, Osaka (JP)

( * ) Notice: Subject to any disclaimer, the term of this patent is extended or adjusted under 35 U.S.C. 154(b) by 15 days.

(21) Appl. No.: 10/594,602

(22) PCT Filed: Mar. 25, 2005

(86) PCT No.: PCT/JP2005/005588

§ 371 (c)(1),
(2), (4) Date: Sep. 28, 2006

(87) PCT Pub. No.: WO2005/098340

PCT Pub. Date: Oct. 20, 2005

(65) Prior Publication Data

US 2007/0187073 A1 Aug. 16, 2007

(30) Foreign Application Priority Data

Mar. 31, 2004 (JP) ............................. 2004-105253

(51) Int. Cl.
*F28F 19/02* (2006.01)
*B21D 53/06* (2006.01)
*F28D 15/00* (2006.01)

(52) U.S. Cl. ............... 165/133; 165/104.21; 165/134.1; 29/890.046

(58) Field of Classification Search .................. 165/133, 165/134.1, 149, 151, 104.12, 104.15; 62/91–94, 62/271; 96/145–146; 29/890.046, 460; 427/430.1, 427/402

See application file for complete search history.

(56) References Cited

U.S. PATENT DOCUMENTS

| | | | | |
|---|---|---|---|---|
| 1,900,865 A | * | 3/1933 | Moore | ......................... 165/149 |
| 3,916,989 A | * | 11/1975 | Harada et al. | ................ 165/151 |
| 4,786,301 A | * | 11/1988 | Rhodes | .......................... 62/271 |
| 4,793,143 A | * | 12/1988 | Rhodes | ........................... 62/93 |
| 5,582,241 A | * | 12/1996 | Yoho et al. | ..................... 165/81 |

(Continued)

FOREIGN PATENT DOCUMENTS

DE 3226502 A * 2/1983

(Continued)

*Primary Examiner*—Tho V Duong
(74) *Attorney, Agent, or Firm*—Birch, Stewart, Kolasch & Birch, LLP (57) ABSTRACT

For the purpose of increasing the area of an adsorbent to be in contact with the air, a heat exchanger (47, 49) includes: a fin set (59) including a plurality of fins (57) arranged parallel to each other with an interval therebetween; a framework (61) arranged to surround end faces of the fin set (59) in the arrangement direction of the fins and end faces of the fin set (59) in the lengthwise direction of the fins; a serpentine heat transfer tube (63) having straight parts (63a) penetrating the fin set (59) in the arrangement direction of the fins and U-shaped parts (63b) protruding out of the framework (61); and a connector tube (65) for connecting the heat transfer tube with a refrigeration pipe. An adsorbent capable of adsorbing moisture from the air and desorbing the moisture into the air is supported on the surfaces of the fin set (59), the framework (61), the heat transfer tube (63) and the connector tube (65), respectively.

6 Claims, 7 Drawing Sheets

U.S. PATENT DOCUMENTS

| | | | |
|---|---|---|---|
| 5,585,145 A | * | 12/1996 | Maier-Laxhuber et al. .. 427/380 |
| 6,102,107 A | * | 8/2000 | Dunne ................... 165/104.12 |
| 2006/0207429 A1 | * | 9/2006 | Yabu ........................... 96/146 |

FOREIGN PATENT DOCUMENTS

| | | |
|---|---|---|
| JP | 07-265649 A | 10/1995 |
| JP | 8-126841 A | 5/1996 |
| JP | 8-200876 A | 8/1996 |
| JP | 2004-085013 A | 3/2004 |

\* cited by examiner

HEAT EXCHANGER

TECHNICAL FIELD

The present invention relates to a heat exchanger of a humidity control system using an adsorbent and a refrigeration cycle to control humidity in the air.

BACKGROUND ART

Patent Document 1 discloses a heat exchange member of a dry-type dehumidifier system including a copper tube and plate-like fins integrally fitted to the circumference of the copper tube. An adsorbent capable of adsorbing moisture from the air and desorbing the moisture into the air is supported on the surfaces of the copper tube and the fins such that the adsorbent is heated or cooled by a refrigerant flowing in the copper tube.

Patent Publication 1: Japanese Unexamined Patent Publication No. H7-265649 (page 2, FIG. 1)

DISCLOSURE OF THE INVENTION

Problem that the Invention is to Solve

If a heat exchanger is a "cross-fin" type fin-and-tube heat exchanger including a fin set consisted of a plurality of fins arranged parallel to each other and a serpentine heat transfer tube having straight parts and U-shaped parts and combined with the fin set, the fin set is generally surrounded by a framework such that the heat exchanger is accommodated in a casing by attaching the framework to the casing. The U-shaped parts of the heat transfer tube and a connector tube for connecting the heat transfer tube with a refrigerant pipe are protruding from the framework.

If, in such a heat exchanger, an adsorbent is supported on the surfaces of the copper tube and the fins in the same manner as in the Patent Publication 1, latent heat processing performance may be enhanced. However, if the fins are formed larger to increase the adsorbent supporting area for the purpose of further enhancing the latent heat processing performance, the size of the heat exchanger increases.

In view of the above, the present invention has been achieved. An object of the present invention is to increase the area of the adsorbent to be in contact with the air without upsizing the heat exchanger.

Means of Solving the Problem

In order to achieve the above-described object, according to the present invention, an adsorbent is supported not only on the copper tube (heat transfer tube) and the fins but also on the other components.

To be more specific, the present invention is directed to a heat exchanger with an adsorbent supported thereon and the following means is adopted.

According to a first aspect of the present invention, a heat exchanger includes a fin set (59) including a plurality of fins (57) arranged parallel to each other with an interval therebetween; a framework (61) arranged to surround end faces of the fin set (59) in the arrangement direction of the fins and end faces of the fin set (59) in the lengthwise direction of the fins; and a serpentine heat transfer tube (63) having straight parts (63a) penetrating the fin set (59) in the arrangement direction of the fins and U-shaped parts (63b) protruding out of the framework (61), wherein adsorbents capable of adsorbing moisture from the air and desorbing the moisture into the air is supported on the surfaces of the fin set (59), the framework (61) and the heat transfer tube (63), respectively.

According to a second aspect of the present invention related to the first aspect, the heat exchanger further includes a connector tube (65) for connecting the heat transfer tube (63) with a refrigerant pipe, wherein an adsorbent capable of adsorbing moisture from the air and desorbing the moisture into the air is supported on the surface of the connector tube (65).

According to a third aspect of the present invention related to the first aspect, the adsorbents are of the same kind.

According to a fourth aspect of the present invention related to the first aspect, the thickness of the adsorbent layer supported on the surfaces of the fins (57) is not less than 50 μm and not more than 500 μm.

According to a fifth aspect of the present invention related to any one of the first to fourth aspects, a fin pitch is not less than 1.2 mm and not more than 3.5 mm.

According to a sixth aspect of the present invention related to any one of the first to fourth aspects, air velocity is not less than 0.5 m/s and not more than 1.5 m/s.

Effect of the Invention

According to the first aspect of the invention, the adsorbents are supported not only on the fin set (59) and the heat transfer tube (63) but also on the framework (61). This makes it possible to increase the area of the adsorbent to be in contact with the air, thereby improving latent heat processing performance without upsizing the heat exchanger.

According to the second aspect of the invention, the adsorbents are supported not only on the fin set (59), the framework (61) and the heat transfer tube (63) but also on the connector tube (65). This makes it possible to further increase the area of the adsorbent to be in contact with the air, thereby improving the latent heat processing performance to a further extent.

According to the third aspect of the invention, it is made possible to support the adsorbent more easily and efficiently by immersing an assembly of the fin set (59), the framework (61) and the heat transfer tube (63) with or without the connector tube (65) in slurry mixed with the adsorbent than by supporting the adsorbent on these components separately.

According to the fourth aspect of the invention, the thickness of the adsorbent layer supported on the surfaces of the fins (57) is made not less than 50 μm and not more than 500 μm. As a result, pressure loss is reduced, fan efficiency is improved and fan noise is reduced.

According to the fifth aspect of the invention, the range of the fin pitch is not less than 1.2 mm and not more than 3.5 mm. Particularly in this range, the effect of the fourth aspect of the invention is sufficiently achieved. This is a commercially successful fin pitch.

According to the sixth aspect of the invention, the range of the air velocity is not less than 0.5 m/s and not more than 1.5 m/s. Particularly in this range, the effect of the fourth aspect of the invention is sufficiently achieved. This is the practical range of the air velocity.

BRIEF DESCRIPTION OF DRAWINGS

FIGS. 1(*a*) to 1(*c*) are schematic views illustrating the structure of a humidity control system.

FIGS. 2(*a*) and 2(*b*) are views illustrating a piping system of a refrigerant circuit of a humidity control system.

FIGS. 4(*a*) to 4(*c*) are schematic views illustrating a humidity control system together with the flow of air during a first action of dehumidifying operation.

FIGS. 5(*a*) to 5(*c*) are schematic views illustrating the humidity control system together with the flow of air during a second action of the dehumidifying operation.

FIGS. 6(*a*) to 6(*c*) are schematic views illustrating the humidity control system together with the flow of air during a first action of humidifying operation.

FIGS. 7(*a*) to 7(*c*) are schematic views illustrating the humidity control system together with the flow of air during a second action of the humidifying operation.

EXPLANATION OF REFERENCE NUMERALS

47 First heat exchanger
49 Second heat exchanger
57 Fin
59 Fin set
61 Framework
63 Heat transfer tube
63*a* Straight part
63*b* U-shaped part
65 Connector tube Best Mode for Carrying Out the Invention Hereinafter, explanation of an embodiment of the present invention is provided with reference to the drawings.

Figure 1:
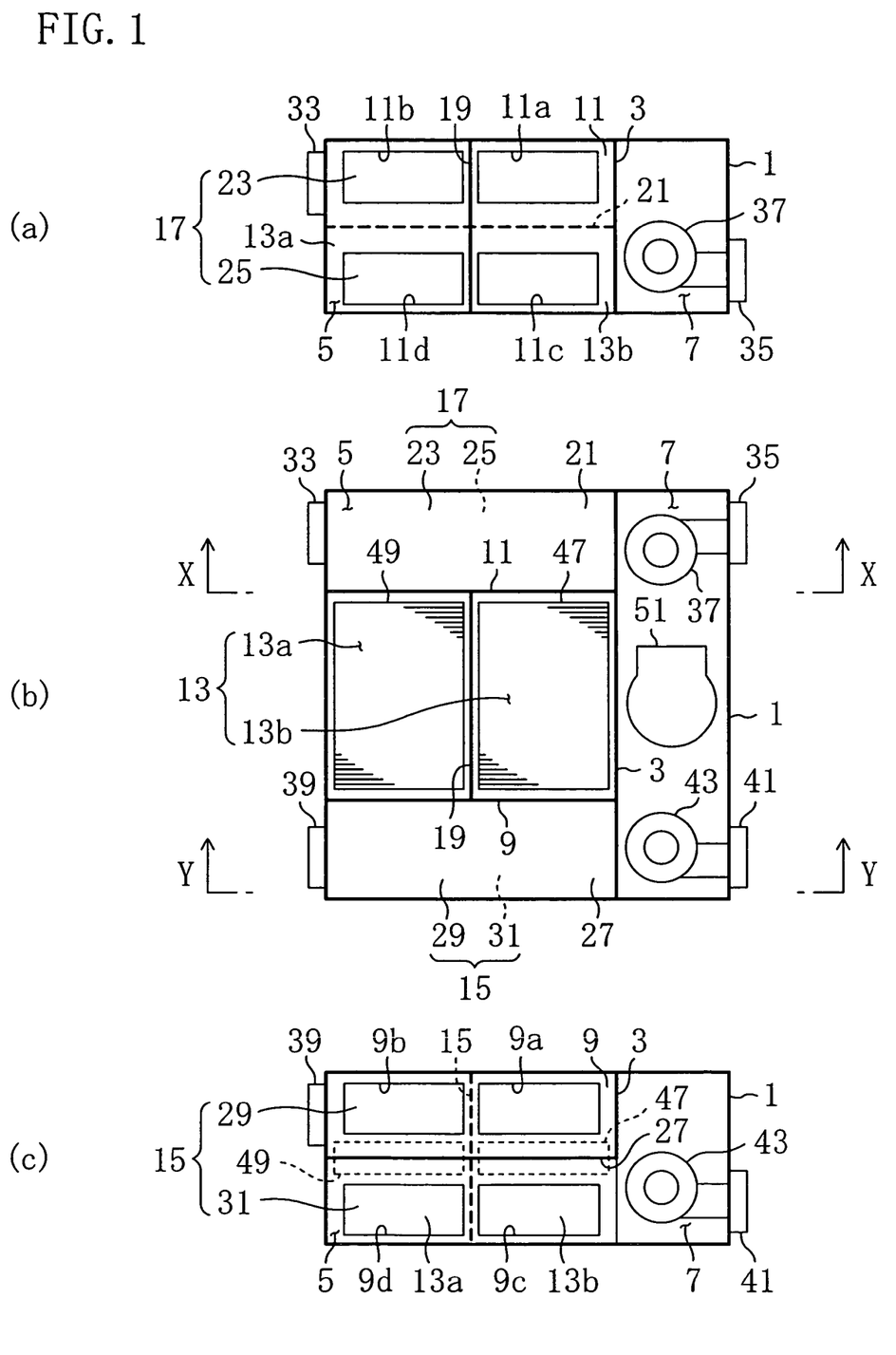

FIGS. 1(*a*) to 1(*c*) are schematic views illustrating the structure of a humidity control system to which a heat exchanger according to the embodiment of the present invention is applied. FIG. 1(*a*) is a sectional view taken along the line X-X shown in FIG. 1(*b*), FIG. 1(*b*) is a plan view illustrating the inside of the system with the front of the system facing the bottom of the figure and FIG. 1(*c*) is a sectional view taken along the line Y-Y shown in FIG. 1(*b*). The humidity control system includes a casing (1) in the form of a rectangular box. A first partition plate (3) extending from front to back is arranged in the casing (1) in order to divide space in the casing (1) into a first spatial area (5) on the left and a second spatial area (7) on the right which is smaller in volume than the first spatial area (5). In the first spatial area (5), a second partition plate (9) and a third partition plate (11) extending from side to side and parallel to each other are provided in order to divide the first spatial area (5) into a third spatial area (13) in the middle, a fourth spatial area (15) at the front and a fifth spatial area (17) at the back. The volume of the third spatial area (13) is larger than the volumes of the fourth and fifth spatial areas (15, 17). The third spatial area (13) is further divided into a left spatial area (13*a*) and a right spatial area (13*b*) by a fourth partition plate (19) extending from front to back. The fifth spatial area (17) at the back is divided into an upper part and a lower part by a fifth partition plate (21) extending horizontally from side to side. The upper part serves as a first flow-in passage (23) and the lower part serves as a first flow-out passage (25). The fourth spatial area (17) at the front is also divided into an upper part and a lower part by a sixth partition plate (27) extending horizontally from side to side. The upper part serves as a second flow-in passage (29) and the lower part serves as a second flow-out passage (31).

In the third partition plate (11), four apertures including first to fourth apertures (11*a* to 11*d*) are provided at the top left, top right, bottom left and bottom right of the third partition plate (11), respectively, such that the left and right spatial areas (13*a*, 13*b*) of the third spatial area (13) communicate with the first flow-in passage (23) and the first flow-out passage (25) (see FIG. 1(*a*)). Further, the second partition plate (9) is also provided with four apertures including fifth to eighth apertures (9*a* to 9*d*) which are arranged at the top left, top right, bottom left and bottom right of the second partition plate (9), respectively, such that the left and right spatial areas (13*a*, 13*b*) of the third spatial area (13) communicate with the second flow-in passage (29) and the second flow-out passage (31) (see FIG. 1(*c*)). The first to fourth apertures (11*a* to 11*d*) and the fifth to eighth apertures (9*a* to 9*d*) are provided with an open/close damper, respectively, though not shown.

In a rear part of the left side surface of the casing (1), an outside air inlet (33) is formed to communicate with the first flow-in passage (23). Further, an exhaust outlet (35) is formed in a rear part of the right side surface of the casing (1). The exhaust outlet (35) is connected to an exhaust fan (37) arranged in a rear part of the second spatial area (29) to communicate with the first flow-out passage (25). In a front part of the left side surface of the casing (1), a room air inlet (39) is formed to communicate with the second flow-in passage (29). Further, an air supply outlet (41) is formed in a front part of the right side surface of the casing (1). The air supply outlet (41) is connected to an air supply fan (43) arranged in a front part of the second spatial area (7) to communicate with the second flow-out passage (31).

Figure 2:
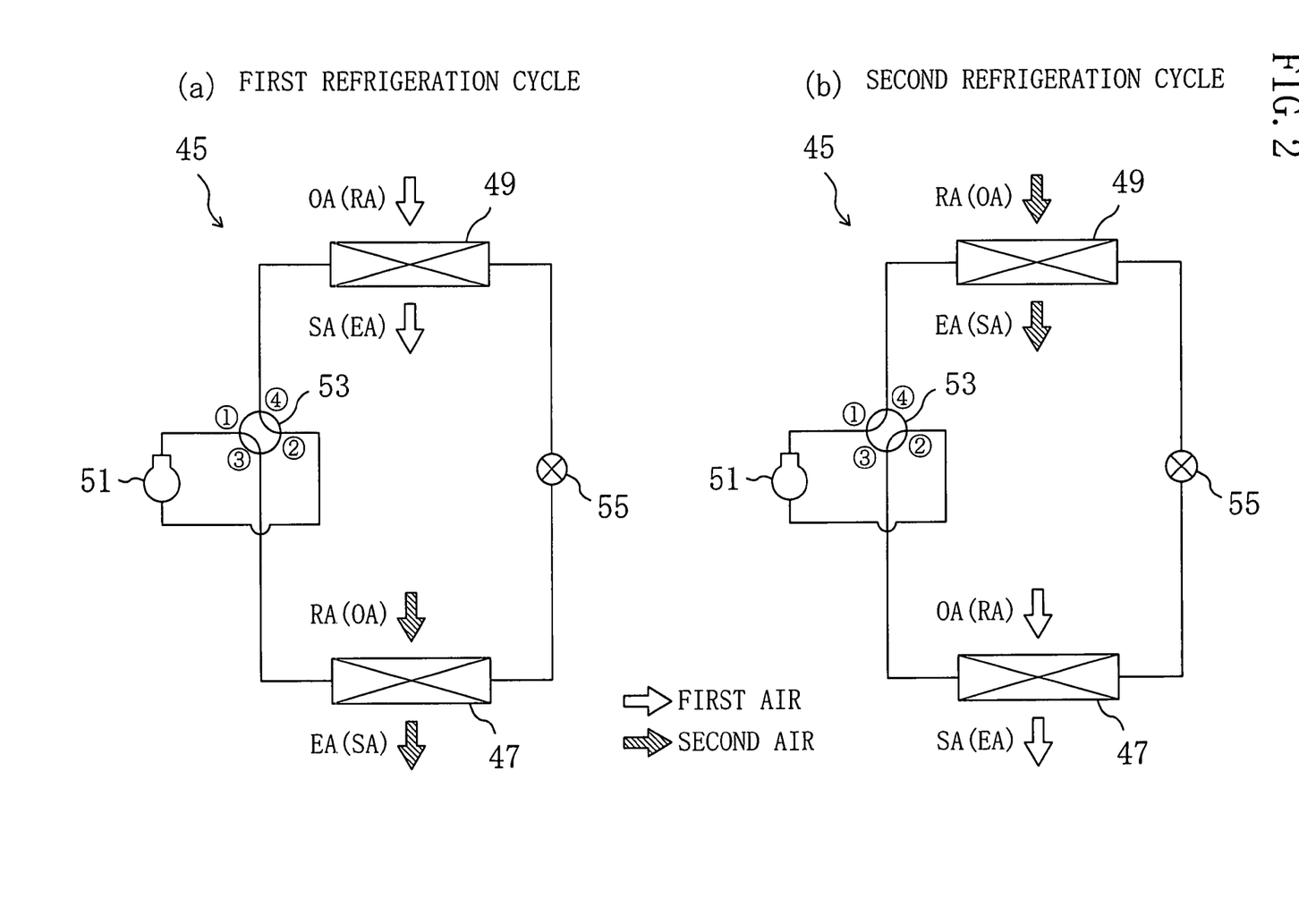

The thus-configured casing (1) contains a refrigerant circuit (45) as shown in FIGS. 2(*a*) and 2(*b*). The refrigerant circuit (45) is a closed circuit including a first heat exchanger (47), a second heat exchanger (49), a compressor (51), a four-way switch valve (53) and a motor-operated expansion valve (55) and filled with a refrigerant. When the refrigerant is circulated, a vapor compression refrigeration cycle occurs. To be more specific, a discharge side and a suction side of the compressor (51) are connected to a first port and a second port of the four-way switch valve (53), respectively. One end of the first heat exchanger (47) is connected to a third port of the four-way switch valve (53) and the other end is connected to one end of the second heat exchanger (49) via the motor-operated expansion valve (55). The other end of the second heat exchanger (49) is connected to a fourth port of the four-way switch valve (53). The four-way switch valve (53) is configured to be able to switch between the state where the first and third ports communicate with each other and the second and fourth ports communicate with each other (the state shown in FIG. 2(*a*)) and the state where the first and fourth ports communicate with each other and the second and third ports communicate with each other (the state shown in FIG. 2(*b*)). According to the switching by the four-way switch valve (53), the refrigerant circuit (45) is switched between a first refrigeration cycle where the first heat exchanger (47) functions as a condenser and the second heat exchanger (49) functions as an evaporator and a second refrigeration cycle where the first heat exchanger (47) functions as an evaporator and the second heat exchanger (49) functions as a condenser. As shown in FIGS. 1(*a*) to 1(*c*), in the refrigerant circuit (45), the first heat exchanger (47) is disposed in the right spatial area (13*b*) of the third spatial area (13), the second heat exchanger (49) is disposed in the left spatial area (13*a*) of the third spatial area (13) and the compressor (51) is disposed in the middle of the second spatial area (7) in the direction from front to back. Though not shown, the four-way switch valve (53) and the motor-operated expansion valve (55) are also arranged in the second spatial area (7).

Figure 3:
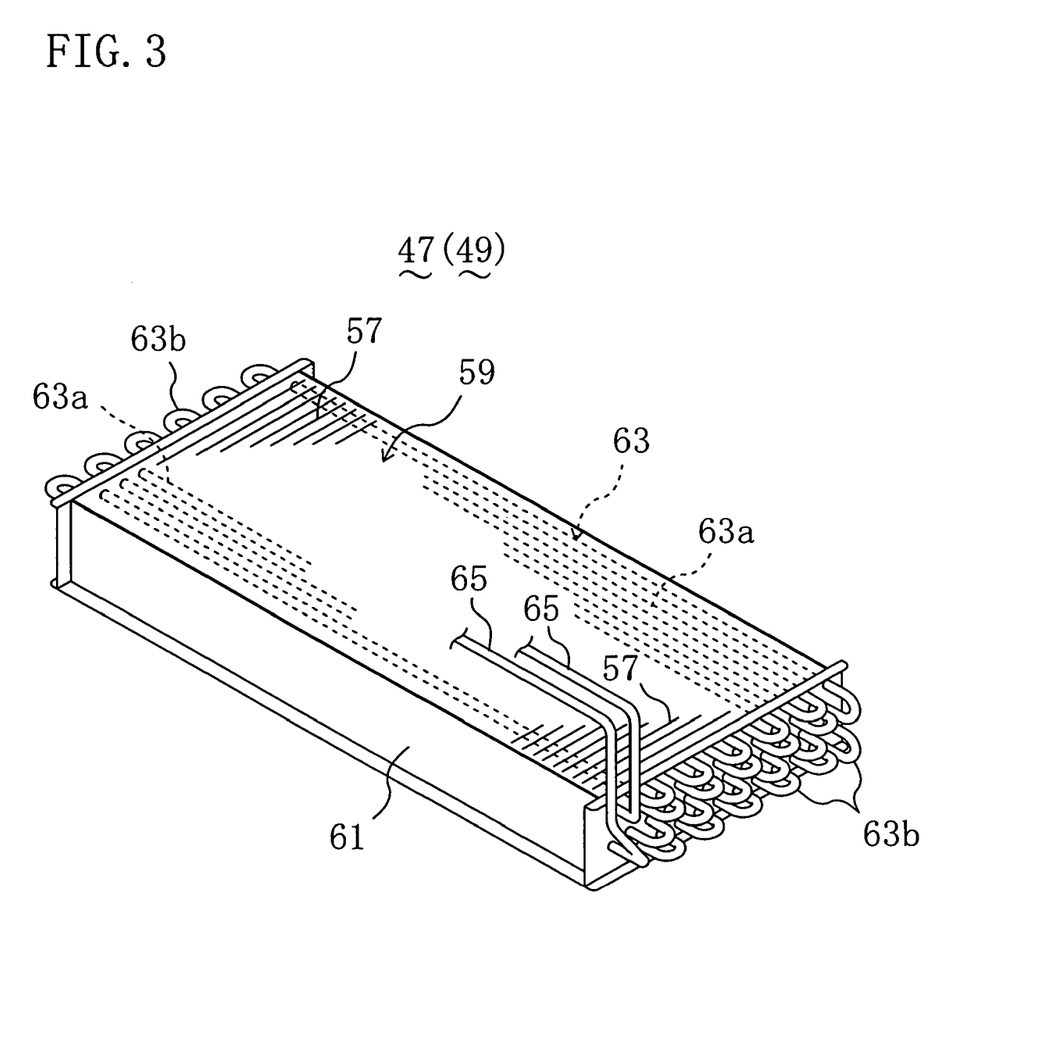
FIG. 3 is a perspective view illustrating first and second heat exchangers.
Figure 4:
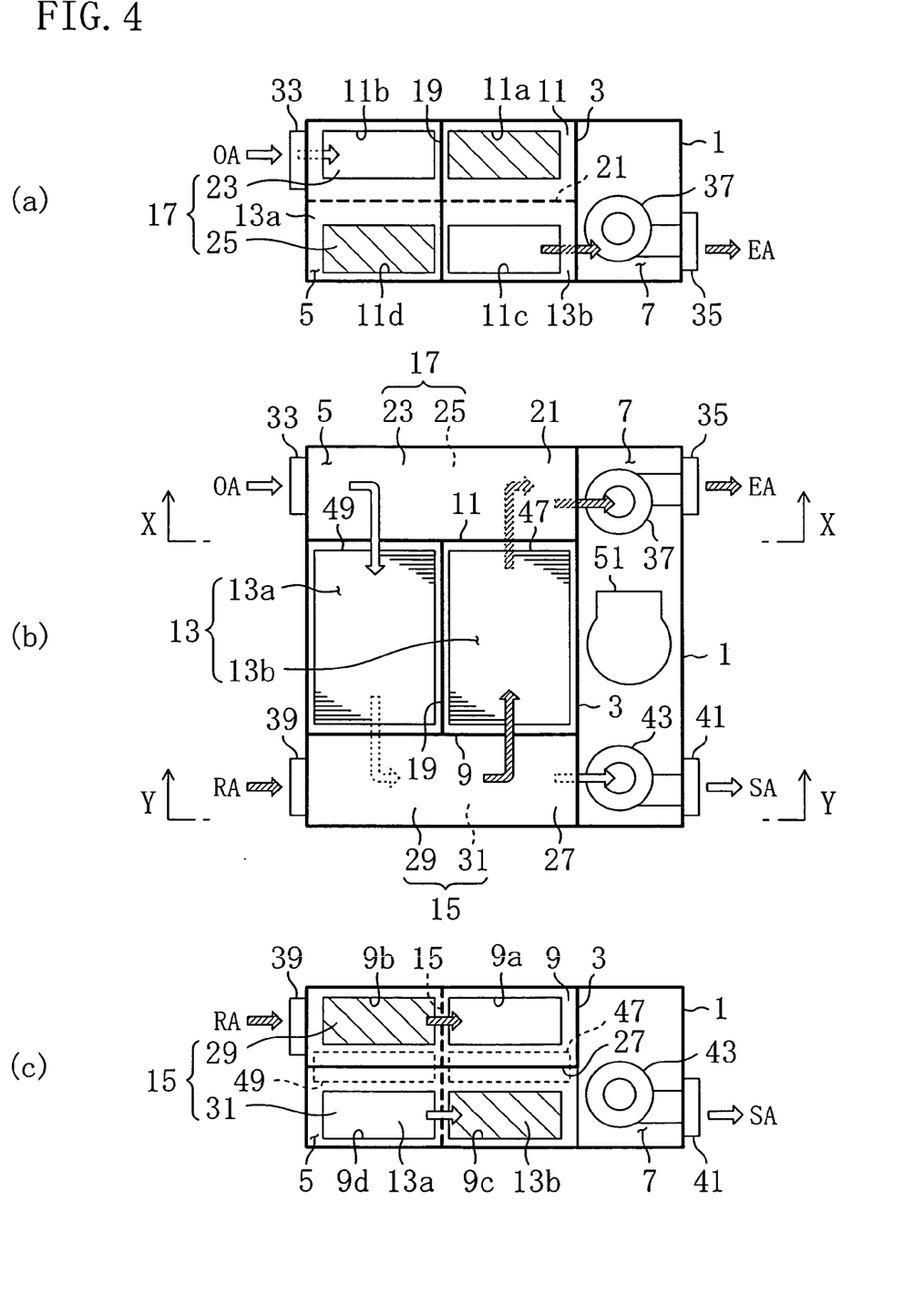
Figure 5:
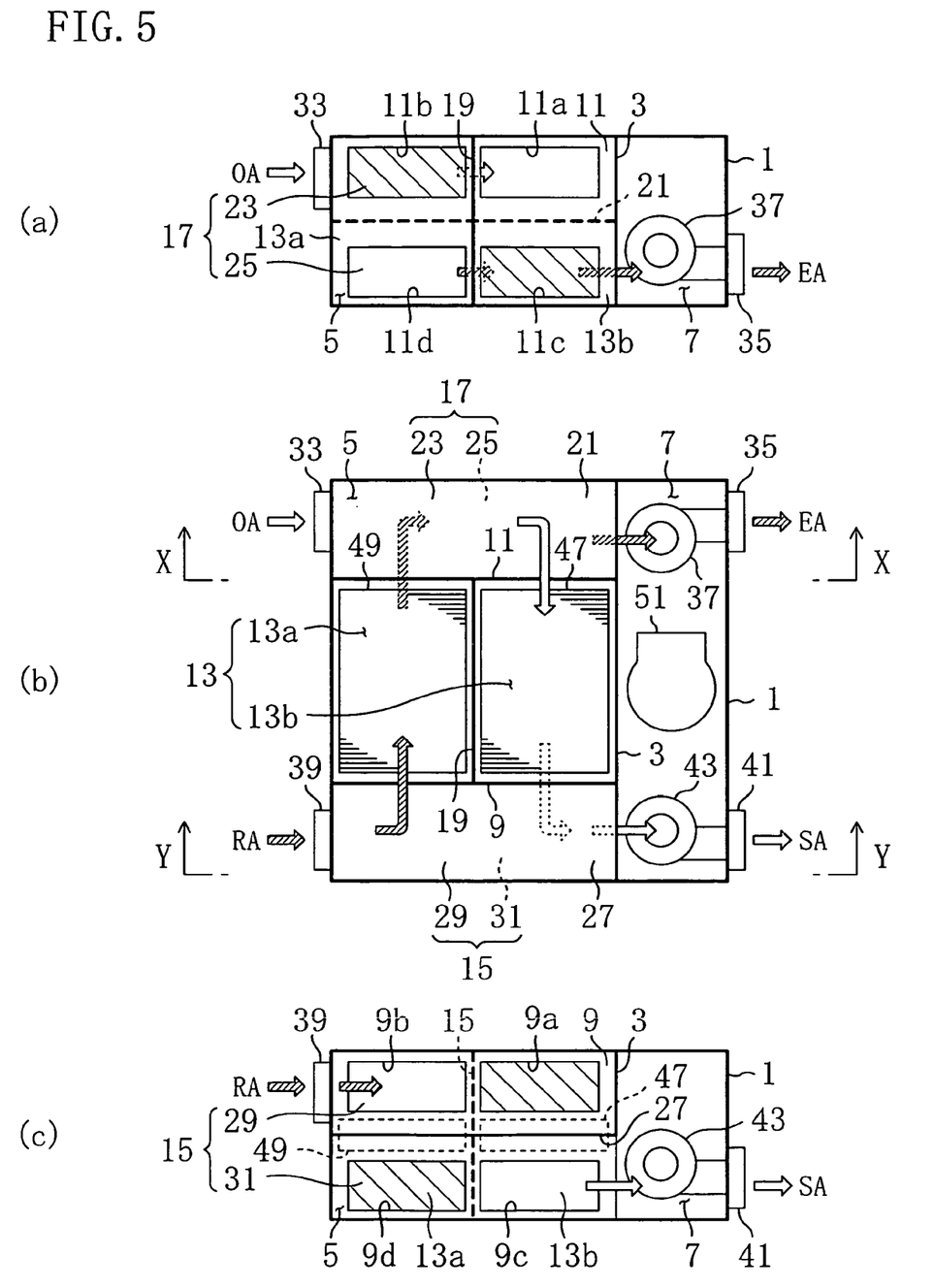

The first and second heat exchangers (47, 49) are "cross-fin" type fin-and-tube heat exchangers as shown in FIG. 3 and each of them includes a fin set (59) consisted of a plurality of aluminum alloy fins (57) arranged parallel to each other with an interval therebetween. The end faces of the fin set (59) in the arrangement direction of the fins and the end faces of the fin set (59) in the lengthwise direction of the fins are surrounded by a rectangular metallic framework (61). The first and second heat exchangers (47, 49) are disposed in the left and right spatial areas (13a, 13b) of the third spatial area (13) via the framework (61), respectively. The fin set (59) is provided with a heat transfer tube (63). The heat transfer tube (63) is serpentine and has straight parts (63a) and U-shaped parts (63b). The straight parts (63a) penetrate the fin set (59) in the arrangement direction of the fins and the U-shaped parts (63b) protrude out of the framework (61). One end of the heat transfer tube (63) is connected to one end of a connector tube (65) such that the heat transfer tube (63) is connected to a refrigerant pipe (not shown) via the connector tube (65). As a feature of the present invention, absorbents (not shown) capable of adsorbing moisture from the air and desorbing the moisture into the air are supported on the outer surfaces of the fin set (59), framework (61), heat transfer tube (63) and connector tube (65) that are in contact with air to be treated, respectively, i.e., the entire outer surfaces of the first and second heat exchangers (47, 49). The adsorbents on these components are of the same kind.

This structure makes it possible to increase the area supporting the adsorbent to be in contact with the air. Therefore, latent heat processing performance is enhanced without upsizing the first and second heat exchangers (47, 49). Further, if an assembly of the fin set (59), the framework (61), the heat transfer tube (63) and the connector tube (65) is immersed in slurry mixed with the absorbent, the adsorbent is supported on these components more easily and efficiently than when the absorbent is supported on these components separately.

The thickness of the adsorbent layer supported on the surfaces of the fins (57) is preferably not less than 50 μm and not more than 500 μm from the viewpoint of reducing pressure loss, improving fan efficiency and reducing fan noise. The thickness of the adsorbent layer is usually determined depending on the relationship among the number of revolutions of the fan, blowing sound and fan efficiency. Now, a humidity control system of the present embodiment (size: W1120×D900×H395, heat exchanger specification: 4 rows, 12 levels, FP 1.6 mm, air velocity 0.9 m/s, volume ratio of heat exchange chamber (third spatial area): 0.4 to 0.5) is taken as an example. Suppose that an allowable limit value of the blowing sound is 55 dBA, it is preferable to operate the system under a static pressure of 38 to 41 mmAq. About 30% of the internal static pressure is lost by the other components, pressure loss allowable for the heat exchanger is calculated by the formula:

pressure loss=(static pressure−external static pressure 6 mmAq)×0.7 to be about 22 to 24.5 mmAq. A trial calculation based on the obtained value shows that the maximum allowable thickness of the supported layer is 500 μm. In reality, when FP (fin pitch) is 1.4 to 2.0 mm, air velocity is 0.8 to 1.2 m/s, the thickness of the supported layer is 150 to 300 μm and the pressure loss is about 10 mmAq, 500 μm is suitable for the upper limit value of the supported layer. On the contrary, if the heat exchanger is downsized, a thickness of 150 μm or less is not enough in consideration of the ability of the adsorbent. Even if the upsizing of the heat exchanger is permitted, a thickness of 50 μm or more is required. The adsorbent layer supported on the other components than the fins (57) that does not affect very much on the increase in pressure loss (e.g., the framework (61), the heat transfer tube (63) and the connector tube (65)) may be formed thicker than the adsorbent layer supported on the fins (57) to improve the adsorption/desorption performance.

In order to achieve the above-described effect, the fin pitch is preferably not less than 1.2 mm and not more than 3.5 mm. This is the practical range of the fin pitch. The air velocity of not less than 0.5 m/s and not more than 1.5 m/s is also preferable to achieve the above-described effect. If the air velocity is less than 0.5 m/s, the size of the heat exchanger is likely to increase more than necessary, thereby providing a useless portion which does not contribute to the heat transfer. On the other hand, if the air velocity exceeds 1.5 m/s, a bypass factor (the amount of air passing over) increases to reduce the efficiency.

The adsorbent is not particularly limited as long as it has excellent moisture adsorption property. Examples thereof may include zeolite, silica gel, activated carbon, organic polymeric material having a hydrophilic or water adsorptive functional group, ion exchange resin material having a carboxyl or sulfonic acid group, functional polymer material such as a temperature sensitive polymer and clay mineral material such as sepiolite, imogolite, allophane and kaolinite. The adsorbent may be supported on the heat exchangers by immersing the heat exchangers into slurry mixed with the adsorbent. However, the method of supporting the adsorbent is not particularly limited as long as the performance of the adsorbent is ensured. If necessary, a binder, an adhesive and other mixtures may be used.

Referring to FIGS. 4 to 7, explanation of how the thus-configured humidity control system performs humidity control operation is provided.

-Humidity Control Operation by Humidity Control System-

The humidity control system is capable of switching between dehumidifying operation and humidifying operation. During the dehumidifying or humidifying operation, a first action and a second action are alternately repeated.

(Dehumidifying Operation)

In the dehumidifying operation, an air supply fan (43) and an exhaust fan (37) are operated in the humidity control system. The humidity control system takes outside air (OA) therein as first air to supply it to the inside of the room and takes room air (RA) therein as second air to exhaust it to the outside of the room.

First, explanation of a first action during the dehumidifying operation is provided with reference to FIGS. 2(a) and 2(b) and FIGS. 4(a) to 4(c). In the first action, the adsorbent is recovered in the first heat exchanger (47) and the outside air (OA) as the first air is dehumidified in the second heat exchanger (49).

During the first action, the four-way switch valve (53) in the refrigerant circuit (45) is switched to enter the state shown in FIG. 2(a). When the compressor (51) is operated in this state, the refrigerant is circulated in the refrigerant circuit (45) to execute a first refrigeration cycle where the first heat exchanger (47) functions as a condenser and the second heat exchanger (49) functions as an evaporator. To be more specific, the refrigerant discharged out of the compressor (51) is condensed in the first heat exchanger (47) by dissipating heat, and then transferred to the motor-operated expansion valve (55) for pressure reduction. The pressure-reduced refrigerant absorbs heat to evaporate in the second heat exchanger (49) and then sucked into the compressor (51) for compression. The compressed refrigerant is discharged again out of the compressor (51).

During the first action, the second aperture (11b), the third aperture (11c), the fifth aperture (9a) and the eighth aperture (9d) are opened, while the first aperture (11a), the fourth aperture (11d), the sixth aperture (9b) and the seventh aperture (9c) are closed.

As shown in FIGS. 4(a) to 4(c), the room air (RA) as the second air is supplied to the first heat exchanger (47) and the outside air (OA) as the first air is supplied to the second heat exchanger (49).

Specifically, the second air entered the system from the room air inlet (39) is sent to the right spatial area (13b) of the third spatial area (13) through the second flow-in passage (29) and the fifth aperture (9a). In the right spatial area (13b), the second air passes through the first heat exchanger (47) from top to bottom, while the adsorbent supported on the outer surface of the first heat exchanger (47) is heated by the refrigerant to desorb moisture. The moisture desorbed by the adsorbent is supplied to the second air passing through the first heat exchanger (47). The second air supplied with the moisture in the first heat exchanger (47) flows out of the right spatial area (13b) of the third spatial area (13) to the first flow-out passage (25) through the third aperture (11c). Then, the second air is sucked through the exhaust fan (37) and discharged out of the room through the exhaust outlet (35) as exhaust air (EA).

The first air entered the system from the outside air inlet (33) is sent to the left spatial area (13a) of the third spatial area (13) through the first flow-in passage (23) and the second aperture (11b). In the left spatial area (13a), the first air passes through the second heat exchanger (49) from top to bottom, while the adsorbent supported on the surface of the second heat exchanger (49) adsorbs moisture in the first air. The heat of adsorption generated at this time is absorbed by the refrigerant. The first air dehumidified in the second heat exchanger (49) flows out of the left spatial area (13a) of the third spatial area (13) to the second flow-out passage (31) through the eighth aperture (9d). Then, the first air is sucked through the air supply fan (43) and supplied to the inside of the room from the air supply outlet (41) as supply air (SA).

Next, a second action during the dehumidifying operation is explained with reference to FIGS. 2(a) and 2(b) and FIGS. 5(a) to 5(c). In the second action, the adsorbent is recovered in the second heat exchanger (49) and the outside air (OA) as the first air is dehumidified in the first heat exchanger (47).

During the second action, the four-way switch valve (53) in the refrigerant circuit (45) is switched to enter the state shown in FIG. 2(b). When the compressor (51) is operated in this state, the refrigerant is circulated in the refrigerant circuit (45) to execute a second refrigeration cycle where the first heat exchanger (47) functions as an evaporator and the second heat exchanger (49) functions as a condenser. To be more specific, the refrigerant discharged out of the compressor (51) is condensed in the second heat exchanger (49) by dissipating heat, and then transferred to the motor-operated expansion valve (55) for pressure reduction. The pressure-reduced refrigerant absorbs heat to evaporate in the first heat exchanger (47) and then sucked into the compressor (51) for compression. The compressed refrigerant is discharged again out of the compressor (51).

During the second action, the first aperture (11a), the fourth aperture (11d), the sixth aperture (9b) and the seventh aperture (9c) are opened, while the second aperture (11b), the third aperture (11c), the fifth aperture (9a) and the eighth aperture (9d) are closed. As shown in FIGS. 5(a) to 5(c), the outside air (OA) as the first air is supplied to the first heat exchanger (47) and the room air (RA) as the second air is supplied to the second heat exchanger (49).

Specifically, the second air entered the system through the room air inlet (39) is sent to the left spatial area (13a) of the third spatial area (13) through the second flow-in passage (29) and the sixth aperture (9b). In the left spatial area (13a), the second air passes through the second heat exchanger (49) from top to bottom, while the adsorbent supported on the outer surface of the second heat exchanger (49) is heated by the refrigerant to desorb moisture. The moisture desorbed by the adsorbent is supplied to the second air passing through the second heat exchanger (49). The second air supplied with the moisture in the second heat exchanger (49) flows out of the left spatial area (13a) of the third spatial area (13) to the first flow-out passage (25) through the fourth aperture (11d). Then, the second air is sucked through the exhaust fan (37) and discharged out of the room from the exhaust outlet (35) as exhaust air (EA).

The first air entered the system through the outside air inlet (33) is sent to the right spatial area (13b) of the third spatial area (13) through the first flow-in passage (23) and the first aperture (11a). In the right spatial area (13b), the first air passes through the first heat exchanger (47) from-top to bottom, while the adsorbent supported on the surface of the first heat exchanger (47) adsorbs moisture in the first air. The heat of adsorption generated at this time is absorbed by the refrigerant. The first air dehumidified in the first heat exchanger (47) flows out of the right spatial area (13b) of the third spatial area (13) to the second flow-out passage (31) through the seventh aperture (9c). Then, the first air is sucked through the air supply fan (43) and supplied to the inside of the room from the air supply outlet (41) as supply air (SA).

(Humidifying Operation)

In the humidifying operation, the air supply fan (43) and the exhaust fan (37) are operated in the humidity control system. The humidity control system takes the room air (RA) therein as first air to exhaust it to the outside of the room and takes the outside air (OA) therein as second air to supply it to the inside of the room.

First, explanation of a first action during the humidifying operation is provided with reference to FIGS. 2(a) and 2(b) and FIGS. 6(a) to 6(c). In the first action, the outside air (OA) as the second air is humidified in the first heat exchanger (47) and moisture in the room air (RA) as the first air is collected in the second heat exchanger (49).

During the first action, the four-way switch valve (53) in the refrigerant circuit (45) is switched to enter the state shown in FIG. 2(a). When the compressor (51) is operated in this state, the refrigerant is circulated in the refrigerant circuit (45) to execute a first refrigeration cycle where the first heat exchanger (47) functions as a condenser and the second heat exchanger (49) functions as an evaporator.

Figure 6:
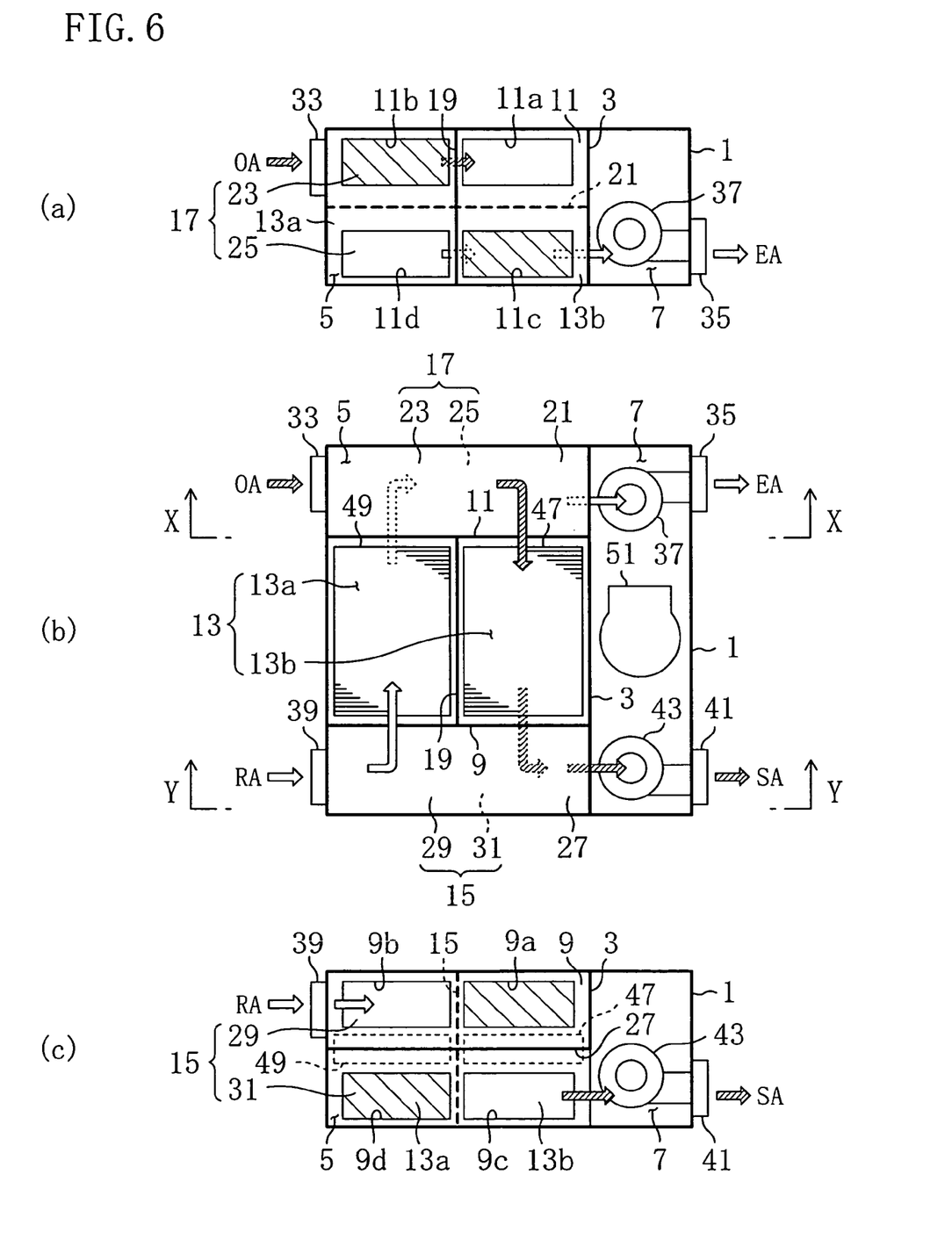
Figure 7:
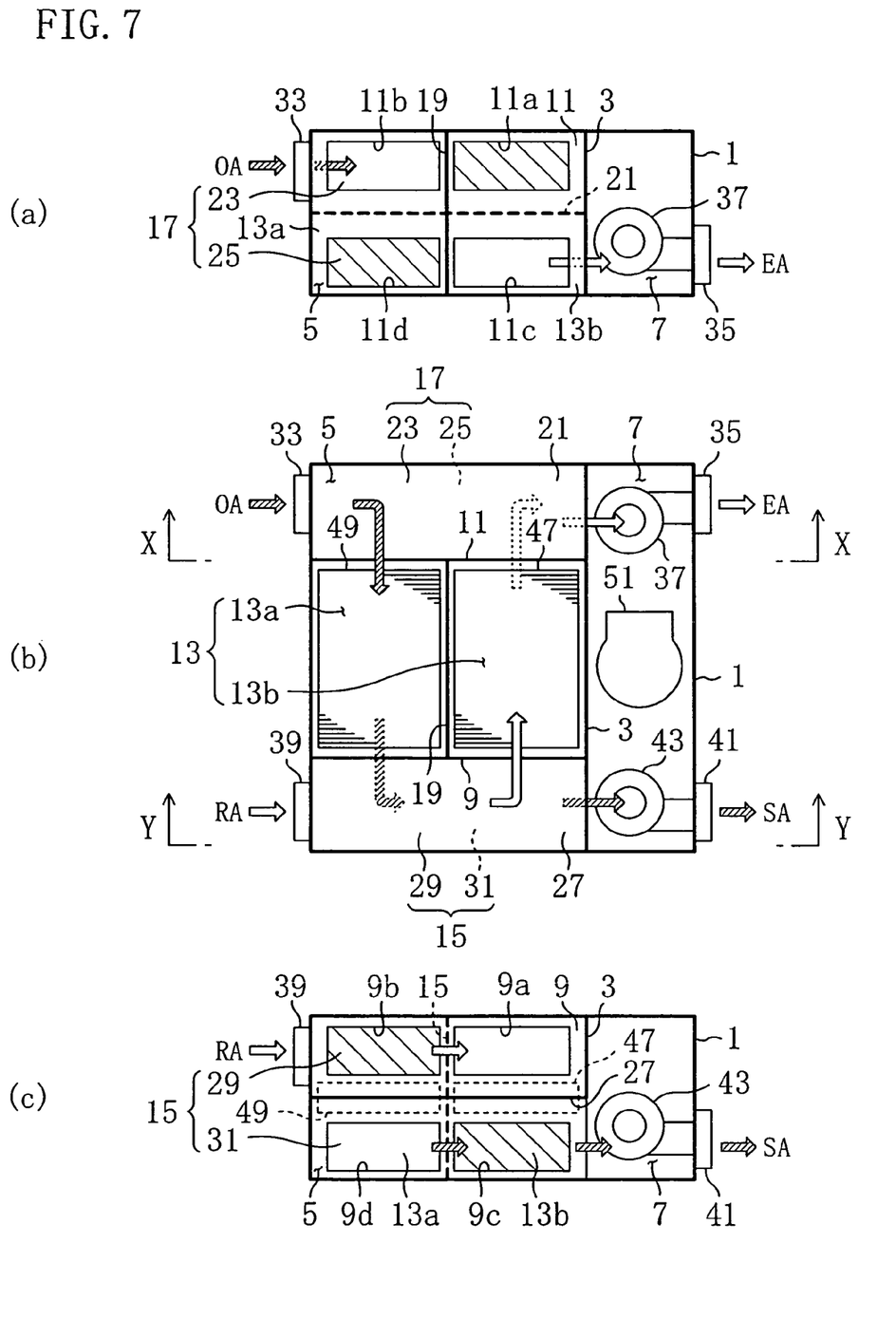

During the first action, the first aperture (11a), the fourth aperture (11d), the sixth aperture (9b) and the seventh aperture (9c) are opened, while the second aperture (11b), the third aperture (11c), the fifth aperture (9a) and the eighth aperture (9d) are closed. As shown in FIG. 6, the outside air (OA) as the second air is supplied to the first heat exchanger (47) and the room air (RA) as the first air is supplied to the second heat exchanger (49).

Specifically, the first air entered the system from the room air inlet (39) is sent to the left spatial area (13a) of the third spatial area (13) through the second flow-in passage (29) and the sixth aperture (9b). In a second heat exchange chamber (42), the first air passes through the second heat exchanger (49) from top to bottom. In the left spatial area (13a), the adsorbent supported on the surface thereof adsorbs moisture in the first air. The heat of adsorption generated at this time is absorbed by the refrigerant. The first air that lost the moisture passes through the fourth aperture (11d), the first flow-out passage (25) and the exhaust fan (37) in this order to be discharged out of the room from the exhaust outlet (35) as exhaust air (EA).

The second air entered the system from the outside air inlet (33) is sent to the right spatial area (13b) of the third spatial area (13) through the first flow-in passage (23) and the first aperture (11a). In the right spatial area (13b), the second air passes through the first heat exchanger (47) from top to bottom, while the adsorbent supported on the outer surface of the first heat exchanger (47) is heated by the refrigerant to desorb moisture. The moisture desorbed by the adsorbent is supplied to the second air passing through the first heat exchanger (47). The humidified second air passes through the seventh aperture (9c), the second flow-out passage (31) and the air supply fan (43) in this order to be supplied to the inside of the room from the air supply outlet (41) as supply air (SA).

Next, a second action during the humidifying operation is explained with reference to FIGS. 2(a) and 2(b) and FIGS. 7(a) to 7(c). In the second action, the outside air (OA) as the second air is humidified in the second heat exchanger (49) and moisture is collected from the room air (RA) as the first air in the first heat exchanger (47).

During the second action, the four-way switch valve (53) in the refrigerant circuit (45) is switched to enter the state shown in FIG. 2(b). When the compressor (51) is operated in this state, the refrigerant is circulated in the refrigerant circuit (45) to execute a second refrigeration cycle where the first heat exchanger (47) functions as an evaporator and the second heat exchanger (49) functions as a condenser.

During the second action, the second aperture (11b), the third aperture (11c), the fifth aperture (9a) and the eighth aperture (9d) are opened, while the first aperture (11a), the fourth aperture (11d), the sixth aperture (9b) and the seventh aperture (9c) are closed. As shown in FIGS. 7(a) to 7(c), the room air (RA) as the first air is supplied to the first heat exchanger (47) and the outside air (OA) as the second air is supplied to the second heat exchanger (49).

Specifically, the first air entered the system from the room air inlet (39) is sent to the right spatial area (13b) of the third spatial area (13) through the second flow-in passage (29) and the fifth aperture (9a). In the right spatial area (13b), the first air passes through the first heat exchanger (47) from top to bottom, while the adsorbent supported on the surface of the first heat exchanger (47) adsorbs moisture in the first air. The heat of adsorption generated at this time is absorbed by the refrigerant. Then, the first air that lost the moisture passes through the third aperture (11c), the first flow-out passage (25) and the exhaust fan (37) in this order to be discharged out of the room from the exhaust outlet (35) as exhaust air (EA).

The second air entered the system from the room air inlet (33) is sent to the left spatial area (13a) of the third spatial area (13) through the first flow-in passage (23) and the second aperture (11b). In the left spatial area (13a), the second air passes through the second heat exchanger (49) from top to bottom, while the adsorbent supported on the outer surface of the second heat exchanger (49) is heated by the refrigerant to desorb moisture. The moisture desorbed by the adsorbent is supplied to the second air passing through the second heat exchanger (49). Then, the humidified second air passes through the eighth aperture (9d), the second flow-out passage (31) and the air supply fan (43) in this order to be supplied to the inside of the room from the air supply outlet (41) as supply air (SA).

The dehumidifying and humidifying operations in a full ventilation mode are explained above. The humidity control system is also capable of performing dehumidification in a circulation mode in which the room air (RA) is taken as the first air and supplied to the inside of the room and the outside air (OA) is taken as the second air and discharged out of the room, as well as humidification in a circulation mode in which the outside air (OA) is taken as the first air and discharged out of the room and the room air (RA) is taken as the second air and supplied to the inside of the room. Further, the humidity control system is also capable of performing dehumidification and humidification in an air supply mode in which the outside air (OA) is taken as the first air and the second air such that part thereof is supplied to the inside of the room and the other is discharged out of the room, as well as dehumidification and humidification in an exhaust mode in which the room air (RA) is taken as the first air and the second air such that part thereof is supplied to the inside of the room and the other is discharged out of the room.

INDUSTRIAL APPLICABILITY

The present invention is useful, for example, as a heat exchanger of a humidity control system for controlling humidity in the air by making use of an adsorbent and a refrigeration cycle.

The invention claimed is:

1. A method of making a heat exchanger, the method comprising:
    surrounding a fin set that includes a plurality of fins arranged parallel to each-other with an interval therebetween with a metallic framework such that the metallic framework is arranged to surround end faces of the fin set in an arrangement direction of the fins and end faces of the fins in the lengthwise direction of the fins;
    penetrating the fin set with a serpentine heat transfer tube such that said tube penetrates the fin set in an arrangement direction of the fins and has u-shaped parts protruding out of the metallic framework;
    coating the surfaces of the framework, fin set, and heat transfer tube with adsorbents that adsorb moisture from the air and desorb moisture into the air; and
    controlling air flow inside the heat exchanger such that air velocity is between 0.5 and 1.5 meters per second, inclusive.

2. The method of claim 1, wherein
    the thickness of the adsorbent coating on the surfaces of the fins set is not less than 50 μm and not more than 500 μm.

3. The method of claim 1, wherein said adsorbents comprise at least one of zeolite, silica gel, activated carbon, organic polymeric material having a hydrophilic or water adsorptive functional group, ion exchange resin material having a carboxyl or sulfonic acid group, functional polymer material, sepiolite, imogolite, allophane, kaolinite.

4. The method of claim 1, where coating includes immersing a heat exchanger assembly including the framework, fin set, and heat transfer tube into a slurry mixed with adsorbent.

5. The method of claim 1, where coating includes determining a coating thickness of said adsorbents such that the coating thickness is determined based on a number of fans used to move air through the exchanger, the efficiency of said fans, and the volume of said fans.

6. The method of claim 1, further comprising connecting the heat transfer tube to a refrigerant pipe with a connector tube, where said connector tube is also coated with said adsorbents.

* * * * *